(12) United States Patent
Bains et al.

(10) Patent No.: US 6,976,558 B2
(45) Date of Patent: Dec. 20, 2005

(54) METHOD AND SYSTEM FOR PERFORMING GEARBOX FINAL ASSEMBLY CLEAN CHECK

(75) Inventors: David Michael Bains, Loveland, OH (US); Robert James Puckett, Washington, MI (US)

(73) Assignee: General Electric Company, Schenectady, NY (US)

( * ) Notice: Subject to any disclaimer, the term of this patent is extended or adjusted under 35 U.S.C. 154(b) by 141 days.

(21) Appl. No.: 09/761,573

(22) Filed: Jan. 18, 2001

(65) Prior Publication Data

US 2001/0032753 A1    Oct. 25, 2001

Related U.S. Application Data

(60) Provisional application No. 60/177,748, filed on Jan. 21, 2000.

(51) Int. Cl.$^7$ .............................................. F16N 33/00
(52) U.S. Cl. .................... 184/1.5; 137/15.04; 210/767; 73/53.07
(58) Field of Search ............................... 184/1.5, 6.21, 184/6.24; 137/15.01, 15.04, 15.05; 210/168, 210/171, 767; 73/53.05, 53.07, 61.72

(56) References Cited

U.S. PATENT DOCUMENTS

| | | | | |
|---|---|---|---|---|
| 3,566,892 A | * | 3/1971 | Logue et al. | 134/102.2 |
| 4,253,953 A | * | 3/1981 | Libertini | 210/168 |
| 4,619,406 A | * | 10/1986 | Fishgal | 184/6.21 |
| 4,625,923 A | * | 12/1986 | Fishgal | 184/6.21 |
| 5,299,449 A | * | 4/1994 | Hardy et al. | 73/61.62 |
| 5,372,219 A | * | 12/1994 | Peralta | 184/1.5 |
| 5,567,306 A | * | 10/1996 | DeWachter | 210/168 |
| 5,698,774 A | * | 12/1997 | Osmanski | 73/61.43 |
| 5,730,870 A | * | 3/1998 | Randolph | 210/409 |
| 5,776,876 A | * | 7/1998 | Garris | 510/247 |
| 5,900,155 A | * | 5/1999 | Bedi | 210/739 |
| 5,964,318 A | * | 10/1999 | Boyle et al. | 184/1.5 |
| 6,073,666 A | * | 6/2000 | Clark, II | 141/65 |
| 6,152,978 A | * | 11/2000 | Lundquist | 55/385.1 |
| 6,206,653 B1 | * | 3/2001 | Dewhirst et al. | 417/312 |
| 6,328,132 B1 | * | 12/2001 | Zager | 184/1.5 |
| 6,452,179 B1 | * | 9/2002 | Coates et al. | 250/339.09 |
| 6,457,564 B1 | * | 10/2002 | Damm et al. | 184/6.5 |

FOREIGN PATENT DOCUMENTS

| | | | | |
|---|---|---|---|---|
| DE | 3808288 | | 9/1988 | |
| GB | 589882 | | 2/1945 | |
| JP | 09089638 A | * | 4/1997 | G01G 17/04 |
| JP | 10170504 A | * | 6/1998 | G01N 33/26 |

* cited by examiner

Primary Examiner—Chong H. Kim
(74) Attorney, Agent, or Firm—William Scott Andes; Armstrong Teasdale LLP

(57) ABSTRACT

A clean check is performed on a gearbox by flushing an oil-based fluid through the gearbox and then through a filter. The filter is then weighed to determine the weight of contaminants collected in the filter. The contaminant weight is compared to a predetermined level, wherein the gearbox is acceptable if the contaminant weight is below the predetermined level. This method is carried out on a system that includes a source of the oil-based fluid fluidly connected to an inlet of the gearbox and a filter fluidly connected to an outlet of the gearbox. A device such as a pump is provided for causing the oil-based fluid to flow through the gearbox and the filter.

27 Claims, 2 Drawing Sheets

METHOD AND SYSTEM FOR PERFORMING GEARBOX FINAL ASSEMBLY CLEAN CHECK

Benefit of Provisional Application No. 60/177,748, filed on Jan. 21, 2000, is hereby claimed.

STATEMENT REGARDING FEDERALLY SPONSORED RESEARCH & DEVELOPMENT

The U.S. Government may have certain rights in this invention pursuant to contract number N00019-96-C-0080 awarded by the Department of the Navy.

BACKGROUND OF THE INVENTION

This invention relates generally to gearboxes and more particularly to clean checks for closed gearboxes used in gas turbine engines.

A gas turbine engine used to propel an aircraft in flight includes a compressor that provides pressurized air to a combustor where the air is mixed with fuel and ignited for generating hot combustion gases. These gases flow downstream to one or more turbines that extract energy therefrom to power the compressor via a shaft and to produce thrust to propel the aircraft.

Aircraft engines ordinarily include a number of accessory devices, such as fuel pumps, lubrication pumps, generators and control units, which are driven by the core engine. This is typically accomplished by an accessory drive train that includes an inlet gearbox, a radial drive shaft, a transfer gearbox, a horizontal drive shaft, and an accessory gearbox. During manufacture and assembly, the gearboxes can become contaminated with metallic particles such as steel shot peen debris. If such a contaminated gearbox is installed on an engine, it is possible that the contaminants could migrate through the engine's lubrication system to other engine components such as bearings. Accordingly it is important that gearboxes installed on engines are contaminant free to preclude the possibility of bearing or other component failures.

Efforts to produce contaminant free gearboxes typically include subjecting the gearbox piece parts to a cleaning and clean check process prior to final assembly. Clean checks of such parts conventionally use an alcohol-based fluid to remove any contaminants that my be present on the parts. Such efforts are not always fully successful because additional contamination can occur during final assembly. Thus, it would be helpful to perform a clean check on the gearbox after final assembly. However, some gearboxes, particularly the accessory gearbox, are "closed gearboxes" in that they are completely closed to the exterior environment. Performing a final assembly clean check on a closed gearbox using a standard alcohol-based fluid will lead to dry spots internal to the gearbox and subsequent corrosion in the gearbox.

Accordingly, there is a need for a system and method to perform clean checks on closed gearboxes after final assembly that will not lead to internal dry spots.

BRIEF SUMMARY OF THE INVENTION

The above-mentioned need is met by the present invention which provides a method of performing a clean check on a gearbox in which an oil-based fluid is flushed through the gearbox and then through a filter. The filter is then weighed to determine the weight of contaminants collected in the filter. The contaminant weight is compared to a predetermined level, wherein the gearbox is acceptable if the contaminant weight is below the predetermined level. This method is carried out on a system tat includes a source of the oil-based fluid fluidly connected to an inlet of the gearbox and a filter fluidly connected to an outlet of the gearbox. A device such as a pump is provided for causing the oil-based fluid to flow through the gearbox and the filter.

The present invention and its advantages over the prior art will become apparent upon reading the following detailed description and the appended claims with reference to the accompanying drawings.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
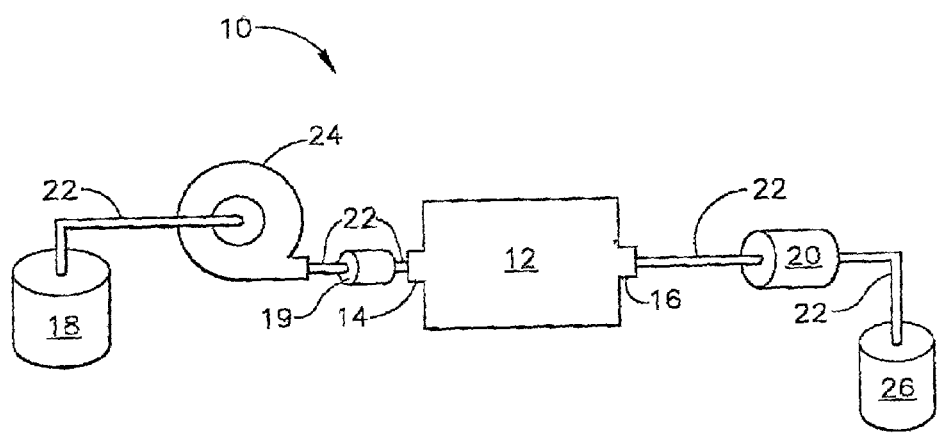
FIG. 1 is a schematic view of a system for performing a final assembly clean check on a closed gearbox.

Referring to the drawings wherein identical reference numerals denote the same elements throughout the various views, a system 10 for performing a clean check on a finally assembled, closed gearbox 12 is shown schematically in FIG. 1. The gearbox 12 can be any sort of gearbox, such as an accessory gearbox in a gas turbine engine, which is closed to its exterior environment. Because gearboxes generally need to be lubricated during operation, the gearbox 12 includes a conventional lube inlet 14 for admitting lubricant into the gearbox 12 and a conventional lube outlet 16 for removing lubricant from the gearbox 12.

The system 10 further includes a clean check fluid source 18, a preliminary filter 19 and a primary filter 20. The clean check fluid source 18 is fluidly connected to the preliminary filter 19, which is in turn fluidly connected to the lube inlet 14. The primary filter 20 is fluidly connected to the lube outlet 16. Specifically, the elements are connected by a plurality of suitable fluid carrying lines 22. A pump 24 or similar means is provided to cause clean check fluid from the source 18 to flow through the preliminary filter 19, the gearbox 12 and then the primary filter 20. As the clean check fluid flows through the gearbox 12, it entrains contaminants that are present internally of the gearbox 12. Contaminants entrained in the clean check fluid are then captured in the primary filter 20 as the fluid passes therethrough. Fluid exiting the primary filter 20 is directed to a fluid collector or reservoir 26 via another fluid carrying line 22. The preliminary filter 19 ensures that the clean check fluid is free of contaminants prior to passing through the gearbox 12.

The weight of the contaminants removed from the gearbox 12 is determined by weighing the primary filter 20 and then comparing the weight of the primary filter 20 after the fluid flush to the filter weight prior to the fluid flush. This weight differential will thus be equivalent to the weight of the contaminants captured in the primary filter 20. Although the pump 24 is shown in FIG. 1 as being located between the clean check fluid source 18 and the gearbox 12, it should be noted that the pump 24 could alternatively be located downstream of the gearbox 12. The system 10 also includes suitable tooling (not shown) for holding the gearbox 12 during the flushing operation.

In one preferred embodiment of the present invention, the clean check fluid is an oil-based fluid. By using an oil-based fluid, the present invention eliminates the internal dry spots that would tend to result if using a conventional alcohol-based clean check fluid in a closed gearbox. Preferably, the oil-based fluid will be of a suitable viscosity so as to flow well and not clog up and also entrain a very large percentage of the contaminant particles in the gearbox. One particular oil-based fluid that has been found to perform satisfactorily is MIL-L-23699 oil. The fluid carrying lines 22 are nylon lined or otherwise made of a material that will not break down while using the MIL-L-23699 oil.

The preliminary and primary filters 19 and 20 are both preferably a 3 micron collection filter. Thus, the filters 19 and 20 will capture contaminant particles sized 3 microns and larger. The filters 19 and 20 should both be large enough to handle the volume of clean check fluid that will be flowing therethrough, which will be as described in more detail below.

Figure 2:
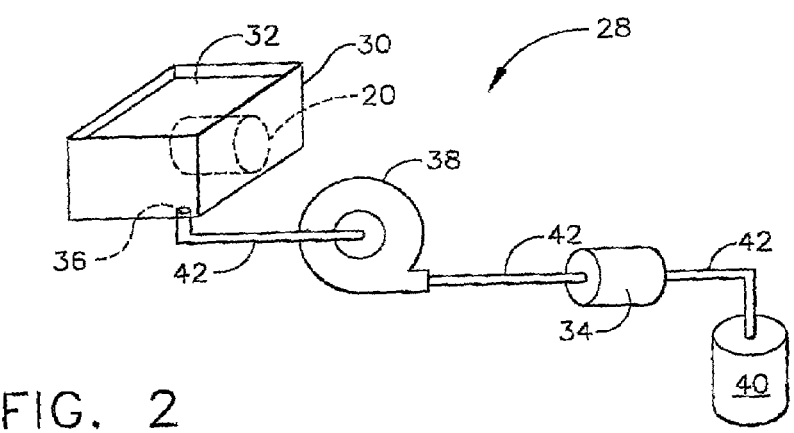
FIG. 2 is a schematic view of an ancillary system used in conjunction with the system of FIG. 1.

During operation of the system 10, the primary filter 20 will trap a certain amount of the oil-based fluid in addition to the contaminants that it is intended to capture. Any residual fluid remaining in the primary filter 20 will be included in the weight differential when the primary filter 20 is weighed after the fluid flush. In order to remove such residual clean check fluid, and thereby eliminate its impact on the contaminant weight determination, an ancillary system 28 is used in conjunction with the primary system 10. The two systems 10 and 28 combine to make up the overall system of the present invention. As shown schematically in FIG. 2, the ancillary system 28 includes a tank 30 containing a solvent 32. The tank 30 is large enough to receive the primary filter 20 therein. Thus, the primary filter 20 can be soaked in the solvent 32. The solvent 32 dissolves the oil-based fluid trapped in the filter primary 20. Examples of solvents suitable for use with the present invention include mineral spirits and isopropyl alcohol (or a combination thereof).

The soaking process removes residual oil from the primary filter 20 while generally leaving the contaminants. However, it is possible that some of the contaminants will be removed from the primary filter 20 along with the dissolved oil-based fluid. In order to recapture these contaminant particles, the ancillary system 28 further includes a secondary filter 34 that is fluidly connected to an outlet 36 formed in the tank 30. The secondary filter 34 also is preferably a 3 micron collection filter. Another pump 38 or similar means is provided to cause the solvent 32 from the tank 30 to flow through the secondary filter 34, which recaptures contaminants entrained in the solvent 32. Fluid exiting the secondary filter 34 is directed to a solvent collector or reservoir 40. As in the primary system 10, all of the elements of the ancillary system 28 are fluidly connected by a plurality of suitable fluid carrying lines 42. The total weight of the contaminants removed from the gearbox 12 is then determined by weighing both filters 20 and 34 and comparing the combined filter weight to the combined weight of the filters 20 and 34 prior to use.

Figure 3:
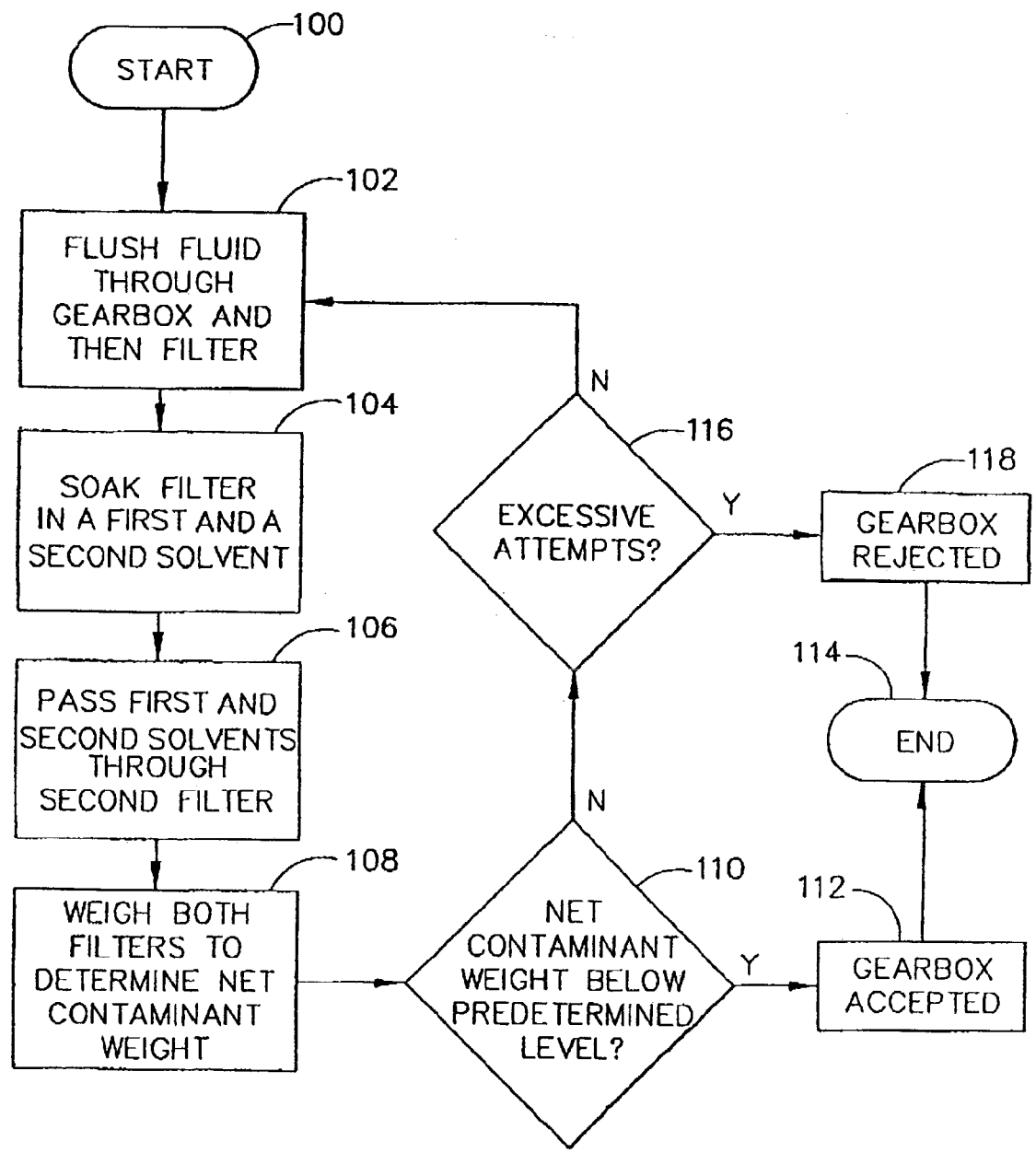
FIG. 3 is a flow chart illustrating a method of performing a final assembly clean check on a closed gearbox.

Referring now to FIG. 3, one preferred embodiment for using the above systems 10 and 28 to perform a clean check on the finally assembled, closed gearbox 12 is described. The method starts at block 100 and proceeds to block 102 where the oil-based fluid is flushed through the gearbox 12 (to entrain contaminants in the gearbox 12) and then through the primary filter 20 (to capture the entrained contaminants). The fluid must be provided in sufficient amounts and at sufficient pressure to thoroughly flush contaminants from the gearbox 12. If the fluid volume and pressure are too low, then not all of the contaminants will be entrained. If the fluid volume and/or pressure are too high, then the primary filter 20 could be damaged. In one preferred arrangement, about 50 gallons of the oil-based fluid is flushed through the gearbox 12 at about 40 pounds per square inch.

The method next proceeds to block 104 where the primary filter 20 is removed from the system 10 and placed in the solvent 32 in the tank 30 to dissolve residual oil-based fluid trapped in the primary filter 20. Next, at block 106, the used solvent 32 is passed through the secondary filter 34 to recapture any contaminants that may have been removed from the primary filter 20 along with the dissolved oil-based fluid during the solvent soak step. In one preferred embodiment, the steps of blocks 104 and 106 are each performed twice Specifically, the primary filter 20 is first soaked in about 300 milliliters of mineral spirits for about 30 minutes, and then it is subsequently soaked in about 300 milliliters of isopropyl alcohol for about 30 minutes. Both of these solvents are passed through the secondary filter 34. It has been found that this combination of solvents is quite effective at dissolving the oil-based fluid.

Once these steps have been completed, both filters 20 and 34 are weighed to determine the cumulative weight of contaminants collected in the filters 20 and 34, as indicated at block 108. Specifically, the two filters 20 and 34 are weighed and then the combined weight of the filters 20 and 34 prior to use is subtracted from the combined post-use weight of the filters 20 and 34 to provide the net weight of captured contaminants.

The method then proceeds to block 110 where the net contaminant weight is compared to a predetermined level to determine the effectiveness of the clean check. If the net contaminant weight is below the predetermined level, then the method proceeds to block 112 where the gearbox 12 is accepted as having passed the clean check, and then the method is completed as shown in block 114. However, if the net contaminant weight exceeds the predetermined level at block 110, then this is an indication that the gearbox 12 is not currently acceptable and the method proceeds to block 116. At block 116, the number of times that the gearbox 12 has gone through the fluid flush is considered. If the gearbox has been subjected to relatively few attempts to flush out contaminants, then the method returns to block 102 so that the flush and soak sequence is repeated in an attempt to achieve the net contaminant weight limit.

If the gearbox has been subjected to numerous attempts and the net contaminant weight still exceeds the predetermined level, then it is unlikely that further fluid flushes will be successful, Generally, more than 2–3 attempts will be considered excessive. At this point, the method proceeds to block 118 where the gearbox 12 is rejected as having failed the clean check, and the clean check method is completed as shown in block 114. Typically, a rejected gearbox will then be torn down and inspected. Parts will be replaced as needed, and the gearbox will be rebuilt. The rebuilt gearbox will then be put through the clean check method beginning at block 100.

The predetermined level below which the net contaminant weight is deemed to be acceptable will have to be determined for each gearbox, primarily dependent on the size of the gearbox. The predetermined level is set at a level at which one can be reasonably assured that the large contaminant particles that would be most damaging to the gearbox or other components have been removed. Generally, the predetermined level will be in the range of 70–90 milligrams.

The foregoing has described a system and method for performing clean checks on finally assembled, closed gearboxes that will not lead to internal dry spots. While specific embodiments of the present invention have been described, it will be apparent to those skilled in the art that various modifications thereto can be made without departing from the spirit and scope of the invention as defined in the appended claims.

What is claimed is:

1. A method of performing a clean check on a gearbox after final assembly, said method comprising the steps of:
   (a) filtering an oil-based fluid in a preliminary filter;
   (b) weighing a primary filter;
   (c) flushing said oil-based fluid through said gearbox and then through said primary filter;
   (d) weighing said primary filter to determine the weight of contaminants collected in said primary filter;
   (e) determining whether said gearbox is acceptable for use by comparing said contaminant weight to a predetermined level, wherein said gearbox is acceptable for use if said contaminant weight is below said predetermined level; and
   (f) repeating steps (a)–(e) if said contaminant weight is above said predetermined level.

2. The method of claim 1 further comprising the step of soaking said primary filter in a solvent prior to said step of (d) weighing said primary filter to determine the weight of contaminants collected in said primary filter.

3. The method of claim 2 wherein said step of soaking said primary filter in a solvent includes soaking said primary filter for about 30 minutes or more.

4. The method of claim 1 further comprising the steps of soaking said primary filter in a first solvent and then soaking said primary filter in a second solvent prior to said step of (d) weighing said primary filter to determine the weight of contaminants collected in said primary filter.

5. The method of claim 4 wherein said first solvent is mineral spirits and said second solvent is isopropyl alcohol.

6. The method of claim 1 wherein said primary filter is a 3 micron collection filter.

7. The method of claim 1 wherein said oil-based fluid is MIL-L-23699 oil.

8. The method of claim 1 wherein said step of flushing an oil-based fluid through said gearbox and then said primary filter includes flushing about 50 gallons of said oil-based fluid through said gearbox at about 40 pounds per square inch.

9. The method of claim 1 wherein said gearbox is a finally assembled, closed gearbox.

10. A method of performing a clean check on a finally assembled, closed gearbox, said method comprising the steps of:
    (a) flushing an oil-based fluid through said gearbox and then through a first filter;
    (b) soaking said first filter in a solvent;
    (c) passing said solvent through a second filter;
    (d) weighing said first and second filters to determine the weight of contaminants collected therein; and
    (e) comparing said contaminant weight to a predetermined level, wherein said gearbox is acceptable if said contaminant weight is below said predetermined level.

11. The method of claim 10 wherein said step of soaking said first filter in a solvent includes soaking said first filter for about 30 minutes or more.

12. The method of claim 10 further comprising the steps of:
    soaking said first filter in a second solvent, subsequently to said step of soaking said first filter in said first-mentioned solvent; and
    passing said second solvent through said second filter.

13. The method of claim 12 wherein said first-mentioned solvent is mineral spirits and said second solvent is isopropyl alcohol.

14. The method of claim 10 wherein said first and second filters are 3 micron collection filters.

15. The method of claim 10 wherein said oil-based fluid is MIL-L-23699 oil.

16. The method of claim 10 wherein said step of flushing an oil-based fluid through said gearbox and then said first filter includes flushing about 50 gallons of said oil-based fluid through said gearbox at about 40 pounds per square inch.

17. The method of claim 10 further comprising the step of flushing said oil-based fluid through a preliminary filter prior to flushing said oil-based fluid through said gearbox.

18. The method of claim 10 wherein steps (a)–(e) are repeated if said contaminant weight is above said predetermined level.

19. A system for performing a clean check on a gearbox having an inlet and an outlet, said system comprising:
    a source of an oil-based fluid fluidly connected to said gearbox inlet;
    a first filter fluidly connected to said gearbox outlet;
    a preliminary filter fluidly connected between said source of an oil-based fluid and said gearbox inlet;
    means for causing said oil-based fluid to flow through said gearbox, said preliminary filter, and said first filter;
    means for soaking said first filter in a solvent,
    means for determining the weight of contaminants filtered in said first filter; and
    means to compare the weight of contaminants filtered against a predetermined level to determine if said gearbox is adequately clean for use after final assembly.

20. The system of claim 19 wherein said means for causing said oil-based fluid to flow through said gearbox and said first filter is a pump.

21. The system of claim 19 wherein said first filter is a 3 micron collection filter.

22. The system of claim 19 wherein said oil-based fluid is MIL-L-23699 oil.

23. The system of claim 19 wherein said solvent is mineral spirits.

24. The system of claim 19 wherein said solvent is isopropyl alcohol.

25. The system of claim 19 further comprising a second filter for passing said solvent through.

26. The system of claim 19 wherein said preliminary filter is a 3 micron collection filter.

27. The system of claim 25 wherein said second filter is a 3 micron collection filter.

* * * * *